United States Patent Office 3,600,259
Patented Aug. 17, 1971

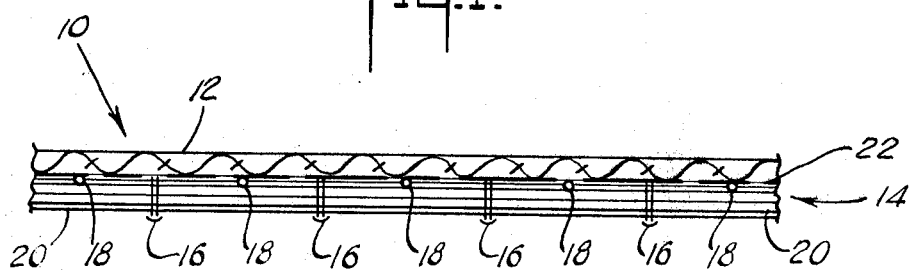
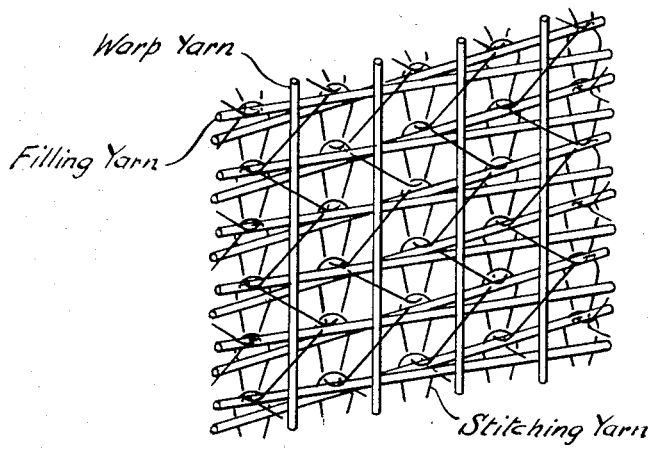
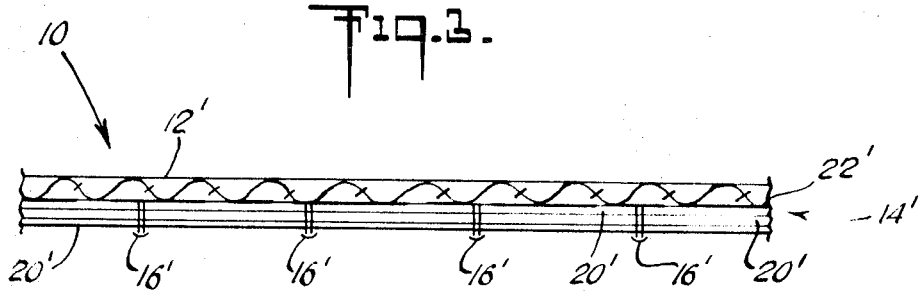

3,600,259
HEAT FUSIBLE BACKING FABRICS AND LAMINATED FABRICS MADE THEREFROM
Delmont K. Smith, Long Meadow, Mass., and John A. Mortensen, Cranford, N.J., assignors to Johnson & Johnson
Filed Jan. 14, 1969, Ser. No. 792,222
Int. Cl. B32b 7/08
U.S. Cl. 161—51                                    9 Claims

ABSTRACT OF THE DISCLOSURE

A laminated fabric having excellent drape, a full body and good bulk comprising (1) a facing fabric having desired visual and tactile properties, especially softness and smooth hand and (2) a backing fabric comprising a layer of fibrous materials stitch-bonded together in an area pattern of stitched warp thread loops normally proceeding generally in the warp or long direction of the fabric, said facing fabric and said backing fabric being adhesively secured together.

---

Figure 4:
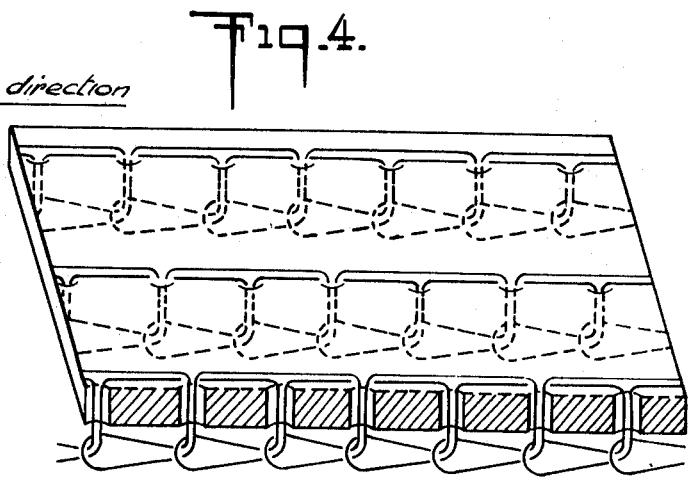

Laminated fabrics are well known in the textile and related industries and have been used for many purposes, especially in the apparel and home furnishings industries.

In many cases, expensive fabrics made from expensive yarns and sometimes by expensive fabrication techniques and having desired visual and tactile properties have been adhesively laminated to backing or supporting fabrics made from less expensive yarns. As a consequence, the resulting laminated fabric not only has the desired appearance, hand and feel which is supplied by the expensive facing fabric, but also has the required thickness, bulk, warmth, body, drape, shape retention, resistance to "bagging," or other properties, which are supplied to a significant degree by the backing or supporting fabric.

Ladies apparel is a striking and prominent example of the application and use of such laminating techniques. The inventive concept will therefore be described further with particular reference to such ladies apparel applications but it is to be appreciated that such is for illustrative purposes and is not intended as limitative of the broader aspects which are involved.

Previously, in many cases, a relatively thin, woven woolen or worsted fabric has been adhesively laminated to a woven cotton fabric and the resulting laminated fabric has proven to be moderately successful in many apparel applications. However, it has been observed that the laminated fabric is often stiffer or boardier than desired and lacks the required drape or flexibility. In many cases, such as when it is desired to get additional body and bulk, a fairly tightly woven construction has been used for the backing fabric but such has merely accentuated the stiffness and lack of flexibility of the resulting laminated fabric.

In order to avoid such undesirable properties, it has also previously been proposed that a knitted fabric be used as the backing or supporting fabric. Such has also achieved some success and the resulting laminated fabrics have been found to possess some of the desired flexibility, softness, body and bulk. However, the difficulties encountered in the handling and processing of the knitted backing fabrics, as well as the difficulties encountered in the bonding and seaming of the same, due to their inherent instability, elasticity, "necking-down" and "give," have militated against the more widespread acceptance of knitted backing fabrics in the industry.

It has now been discovered that many of the objectionable features of the use of woven and knitted backing fabrics can be avoided and a much more acceptable laminated fabric can be obtained by using as the backing or supporting fabric a layer of fibrous material which has been stabilized by being stitched-through or stitch-bonded together in an area pattern of stitched warp thread loops which normally proceed generally in the warp or long direction of the fabric, with the facing fabric and the backing fabric being adhesively secured together by an area pattern of intermittent, spaced, discrete binder segments.

It has also been surprisingly discovered that a typical stitch-bonded backing fabric which is stiffer and has poorer drape and flex properties than a comparable typical prior art woven backing fabric, upon being laminated to a standard wool fabric facing, will result in a more flexible laminated fabric with better drape than will the comparable typical prior art woven backing fabric, when laminated to the same standard wool facing fabric.

In the following specification and accompanying drawings, there are described and illustrated preferred embodiments of the inventive concept, but it is to be understood that the invention in its broader aspects is not to be construed as limited thereto, except as determined by the scope of the appended claims.

Figure 5:
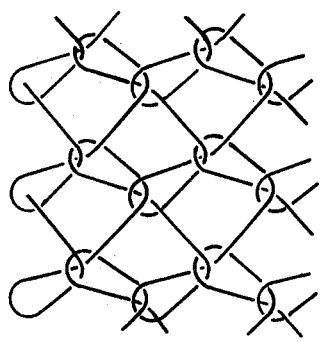
Figure 6:
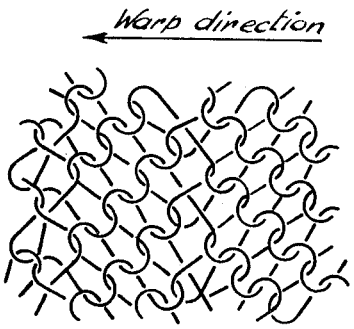
Figure 7:
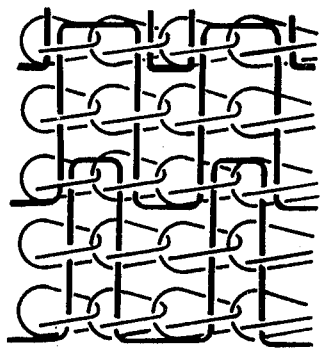

With reference to the accompanying drawings, there is shown: FIG. 1, which is an enlarged schematic cross-sectional drawing, showing the basic elements of a portion of the laminated fabric of the present invention, looking in the warp or long direction of such fabric; FIG. 2, which is an enlarged schematic fragmentary perspective drawing, showing one embodiment of a portion of a stitch-bonded backing fabric using an interlocking chain or tricot stitch used in making some of the laminated fabrics of the present invention; FIG. 3, which is another embodiment of a laminated fabric of the present invention in which a plain chain stitch is used and warp yarns are omitted from the fibrous layer;

FIG. 4, which is a fragmentary, perspective view of a stitch-bonded stabilized laminated fabric, using the plain chain stitch illustrated in FIG. 3;

FIG. 5, which illustrates another embodiment of a stitch, namely, a closed plain stitch, divided 1:1, which is useful in the application of the present invention;

FIG. 6, which illustrates still another embodiment of a stitch, namely, a four-row open work sateen stitch, which is also useful in the application of the present invention; and FIG. 7, which illustrates still another embodiment of a stitch, namely, a closed chain stitch with a weft stitch, which is also useful in the application of the present invention.

In the embodiment of the invention shown in the drawings and with particular reference to FIG. 1, there is shown a laminated fabric 10 which comprises a facing fabric 12 and a stitch-bonded backing fabric 14 which are adhered together in intermittent, spaced fashion by an adhesive material 22.

FACING FABRIC

The facing fabric 12 is normally selected to furnish the desired visual and tactile properties, especially softness and smooth hand or feel, although other characteristics and properties are frequently desired.

The facing fabric 12 is normally woven, knitted, or nonwoven, although other types of fabrics are to be considered as applicable to the broader aspects of the present invention. Such other types of fabrics include, for example, felted fabrics, braided fabrics, lace, etc.

The weight of the facing fabric 12 may be varied within relatively wide limits and may be as light as about 2 ounces per square yard up to as much as about 22 ounces per square yard. Preferably, however, the weight of the facing fabric 12 will be in the range of from about 4 ounces per square yard up to about 14 ounces per square yard.

The yarns used in the facing fabric 12 are preferably natural fibers of animal origin such as wool, mohair, alpaca, etc. However, other fibers or filaments, either natural or man-made, may be used. Examples of such other fibers and filaments would include natural fibers such as cotton, silk, etc., or man-made fibers and filaments such as the acrylics some of which are sold under the trademarks "Acrilan," "Creslan," and "Orlon," the modacrylics, one form of which is sold under the trademark "Dynel," polyesters, some of which are sold under the trademarks "Dacron" and "Kodel," rayon, cellulose acetate and triacetate, nylon 66, nylon 6, spandex, one form of which polypropylene and polyethylene, glass, one form of which is sold under the trademark "Fiberglas," etc. Blends of the above fibers in various proportions are included.

BACKING FABRIC

The backing fabric 14 is a flexible, stabilized fabric comprising a layer of fibrous material which has been sewn through or stitched together in an area pattern of stitched thread rows of warp thread loops 16 which normally proceed generally in the warp or long direction of the backing fabric 14.

The yarns used in the backing fabric are preferably natural or synthetic cellulosic yarns, primarily cotton or rayon. Other natural or synthetic yarns, however, may be used where their particular properties and characteristics may be of use. Such other yarns would include other natural fibers such as wool, silk, etc. and other man-made fibers such as acrylics some of which are sold under the trademarks "Acrilan," "Creslan," and "Orlon," the modacrylics, one form of which is sold under the trademark "Dynel," polyesters, some of which are sold under the trademarks "Dacron" and "Kodel," cellulose acetate and triacetate, nylon 66, nylon 6, spandex, one form of which is sold under the trademark "Lycra," polyolefins such as polypropylene and polyethylene, glass, one form of which is sold under the trademark "Fiberglas," etc. Blends of the above fibers are included.

The weight of the backing fabric may be varied within relatively wide limits and may be as low as about ½ ounce per square yard and may be as high as about 20 ounces per square yard. Preferably, however, the backing fabric is in the range of from about 1 ounce per square yard to about 12 ounces per square yard.

LAYER OF FIBROUS MATERIAL

The layer of fibrous material which is stabilized by being sewn through or stitched together preferably comprises (1) a plurality of warp yarns 18 which extend generally in the long direction of the layer of fibrous material and (2) a plurality of weft or filling yarns 20 which extend generally in the cross direction of the layer of fibrous material, generally in a sort of nonwoven scrim fashion.

It is not essential that warp yarns 18 always be used in the preparation of the backing fabric to be used in making the laminated fabric 10 illustrated in FIGS. 1 and 2. Such warp yarns may be omitted and such an embodiment is shown in FIG. 3. Reference numerals (with superscripts) are used in FIG. 3 to identify fabric structure elements corresponding to similar fabric structural elements in FIG. 1.

When the backing fabric comprises warp yarns, filling yarns and stitching yarns, the number of such yarns per square inch of fabric and the weight, size and nature of such yarns may be varied within relatively wide limits.

WARP YARNS

If warp yarns are used, there may be as few as about 1 warp end per inch, or there may be as many as about 120 warp ends per inch. Preferably, however, there may be from about 3 warp ends up to about 88 warp ends per inch. The weight and size of such warp yarns may vary and, in the case of cotton yarns, may range from about 4's cotton singles to about 80's cotton singles. Preferably, however, they may range from about 6's cotton singles to about 60's cotton singles.

If yarns other than cotton are used and a different yarn or filament count system is involved, the weights and sizes of such other yarns or filaments should be comparable to those weights and sizes for cotton yarns, as described above. This, of course, applies equally to other references to cotton yarns which are used herein and it is to be appreciated that other yarns of equal weight and size may also be substituted therefor.

The layer of fibrous material, instead of merely comprising warp and filling yarns, may also take such forms as a layer of cross-laid card webs, a layer of random-laid fibers, or even layers of loose fibrous materials such as batting, wadding, fleece, a loose array of filling threads, paper, etc.

FILLING YARNS

For the filling yarns, there may be as few as about 8 filling yarns per inch or there may be as many as about 150 filling yarns per inch. Preferably, however, the number of filling yarns should be in the range of from about 10 to about 60 ends per inch. The weight and size of such filling yarns may vary and, in the case of cotton yarns, may range from about 9's cotton singles to about 60's cotton singles. In the case of filamentary yarn, such as rayon, for example, the denier may range from about 900 denier down to about 25 denier.

STITCHING YARNS

For the stitching yarns, there may be as few as about 3 stitching yarns per inch of fabric width or there may be as many as about 26 stitching yarns per inch of fabric width. Preferably, however, the number of stitching yarns per inch of fabric width should be in the range of from about 7 to about 22. The weight and size of such stitching yarns may vary and, in the case of cotton yarns, may range from about 6's cotton singles to about 70's cotton singles. In the case of filamentary yarn, such as rayon, the denier may range from about 1000 denier down to about 30 denier.

If man-made filamentary yarn is used for the stitching yarn, or for warp or filling yarns, multifilamentary yarns are preferred, especially in the larger sizes. Monofilaments, however, are of use, especially in the smaller sizes.

The stitching yarn used to sew through and stitch-bond the layer of fibrous materials together may have a stitch length of from about one-eighth or even three-sixteenth of an inch down to about one-sixteenth of an inch in the warp or machine direction. Shorter stitch lengths down to one-sixty fourth of an inch in the machine direction may be employed where circumstances warrant such lengths. Various gauge textile machines from about 7 gauge up to about 22 gauge or even 26 gauge may be used in the sewing through or stitch-bonding process wherein the stitching yarns stabilize the layer of fibrous materials. Larger or smaller gauge machines may be used for special situations.

The type of stitch used to stabilize the fibrous layer is preferably the interlocking chain stitch or tricot stitch illustrated in FIG. 2 of the drawings. Other types of stitches may be used such as plain chain stitch, as shown in FIGS. 3 and 4; combinations of interlocking chain stitches and plain chain stitches; closed plain stitches as shown in FIG. 5; or even more elaborate complicated stitches such as a sateen stitch as shown in FIG. 6, or even a so-called "weft stitch" shown in FIG. 7.

Various textile machines capable of producing stitch-bonded fabrics (or stitch-through fabrics or stitch-knitted fabrics) are well known on the market. Disclosures of such machines, the so-called "Mali" machines, for example, are noted in U.S. Pats. 2,890,579 and 3,174,308. Publications describing other forms of suitable machines, for example, the so-called "Arachne" machines, are noted in the Textile Recorder, November 1961, pages 80-82 and 86, and the Textile Manufacturer, December 1961, pages 485-488.

ADHESIVE SYSTEM

The facing fabric and the backing fabric may be adhered together by any one of several well known techniques now known in the laminating industry. Thermoplastic, heat-activatable discrete granules or other small particles, for example, of polyethylene, may be deposited in dry, tacky or molten fashion on the backing fabric in a random but substantially uniform, discontinuous, intermittently-spaced deposition. The specific methods of applying the granules or particles of the thermoplastic heat-activatable materials are not critical and substantially any known process of uniform distribution may be employed whereby the granules or particles are deposited in discontinuous intermittently-spaced fashion. For example, the granules may be sifted through screens having openings of a desired size, such as slightly greater than the largest granules present. Or, if desired, the granules may be deposited from a "salt shaker" form of apparatus whereby the backing fabric material passes under a vibrating container having openings in the bottom thereof to permit the granules to pass therethrough and to fall upon the backing fabric passing thereunder. After the granules have been deposited on the fabric, passage through a heated oven takes place to soften the granules and to cause them to adhere to the fabric.

Typical apparatus and processes for carrying out the application of granules and the subsequent heating thereof are noted in U.S. Pats. 2,603,575, 2,732,324 and 2,992,149. It is to be appreciated, however, that other apparatus and other methods may be employed to carry out such functions.

The granules may thus be temporarily heated, if necessary, to a high enough temperature for a sufficiently long enough time to soften them whereby they adhere to the backing fabric. If desired, pressure may be applied to press the granules or other particles into the backing fabric to insure good adherence thereto.

The backing fabric and the facing fabric are then brought together with the potentially adhesive material in the middle with heat and pressure being applied for a sufficiently long enough time to activate and soften the potentially adhesive material to bond the two fabrics together.

The amount of adhesive add-on will vary according to the type of fabrics involved, their weights, etc. For the purposes of this invention, it has been found that from about 10 grams (154 grains) to about 60 grams (924 grains) per within the more commercial aspects, from about 15 grams (231 grains) to about 40 grams (616 grains) per square yard of fabric is found most useful.

Many different adhesive materials may be used to bond the backing fabric and facing fabric. Granular polyethylene, polyvinyl acetate, and polyamides have been found to be very satisfactory for most applications. Other thermoplastic, heat-activatable materials, or other materials having inherently tacky and adhesive properties may be used. Among such other adhesive materials are included cellulose acetate, polyamides, polyvinyl acetate, acrylics, polyesters, polyurethanes, etc. Homopolymers and copolymers of these are also of use. Natural adhesives are also of utility.

The temperatures, pressures, times and duration of heat application of the thermoplastic adhesive material are all interrelated as is well known in the laminating art. The temperatures should, of course, be kept as low as possible, providing sufficient bonding temperatures are obtained, to avoid damaging or scorching the fabrics being bonded. Normally, adhesive-line temperatures ranging from as low as 150° F. up to about 350° F. are employed, although for some adhesives and for some fabrics, temperatures ranges of from about 120° F. up to 500° F. are possible.

It is not essential that a dry deposition of discrete granules in random but generally uniform fashion be used. Globules, or other small liquid masses, of soft, tacky adhesive materials may be printed on the backing fabric in any desired discontinuous, intermittently-spaced predetermined pattern to be immediately adhered thereto, whereby the temporary heating step may be omitted. One example of such would be a deposition of a vinyl chloride plastisol in a predetermined intermittently-spaced "dot" pattern. Subsequent positioning together of the facing fabric and the backing fabric, plus the application of heat and pressure, will then bond the two fabrics together. A liquid adhesive may also be deposited in an intermittently-spaced, predetermined pattern on the backing fabric and may have such a nature that it will remain wet and tacky sufficiently long enough so that the facing fabric may be applied thereto and adherence accomplished merely by the application of sufficient heat and/or pressure.

For example, an acrylic adhesive in a thickened, aqueous system may be printed on either the backing fabric or the facing fabric which was then combined and dried under sufficient pressure and heat to set the adhesive bond. Curing then is usually employed to improve dry cleanability and launderability.

In FIG. 1, the adhesive material 22 is noted as contacting the side of the backing fabric wherein the warp yarns 20 are exposed. This is not always necessary. In many cases, it is preferred that the adhesive material 22 contact the opposite side, that is, the side away from the warp yarns, or the side wherein the looped portion of the stitching fabric is located. In FIG. 1, it is, of course, the lowermost portion of the backing fabric, as viewed therein.

The invention will be described in particularity by reference to the following examples which, of course, are merely illustrative and not limitative of the present invention. In these examples, the "trumpet" test referred to is to be found and fully described in U.S. Patent 3,151,483 which issued Oct. 6, 1964. The "drape-flex" test referred to is to be found and fully described in Federal Specification CCC-T-191B (Method 5206).

Example 1

A standard woven backing fabric, such as is well known in the prior art, is used and has the following specifications: 38 warp yarns per inch of 30's singles cotton; 36 filling yarns per inch of 40's singles cotton in a plain weave pattern; and a fabric weight per square yard of about 1.6 ounces (720 grains).

The flexibility and drape of this standard prior art woven backing material is determined by a trumpet test and by a drape-flex test. The results of such tests are as follows:

| Trumpet test: | Grams |
|---|---|
| Warp | 8 |
| Filling | 11 |

| Drape-flex test: | Inches |
|---|---|
| Warp | 2.16 |
| Filling | 2.44 |

The facing fabric which is used is a black, woven twill, woolen facing fabric having a weight per square yard of about 8 ounces (3492 grains).

The woven backing fabric is adhesively secured to the woolen facing fabric by dry deposition in intermittent-spaced fashion on the woven backing fabric of about 0.8 ounce (350 grains) per square yard of thermoplastic, heat-activatable polyethylene granules having a nominal mesh size of 30 mesh.

The pressure bonding of the two fabrics takes place on a continuous bonding machine at a drum temperature of about 310° F.

The weight of the laminated fabric is about 10.5 ounces (4572 grains) per square yard. The flexibility and drape is determined by a trumpet test and by a drape-flex test. The results of such tests are as follows:

Trumpet test: Grams
    Wool side down—total readout _____ 325
    Reverse side—total readout _____ 240

Drape-flex test: Inches
    Warp _____ 3.10
    Filling _____ 1.93

The results of these tests indicate that the laminated fabric has acceptable drape and flexibility and has a reasonably soft hand and feel. The laminated fabric is suited for use as ladies coating material.

Example 2

The procedures of Example 1 are followed substantially as set forth therein except that a comparable stitch-bonded backing fabric of the present invention is substituted for the conventional prior art woven backing fabric used therein.

A stitch-bonded backing fabric of the present invention, as illustrated in FIG. 1, is prepared with the following specifications: 6 warp yarns per inch of 30's singles cotton; 20 filling yarns per inch of 30's singles cotton; 18 stitching yarns per inch of 30's singles cotton; the stitch used is an interlocking chain stitch (tricot stitch) such as illustrated in FIGS. 1 and 2, having a stitch length in the warp or long direction of about 0.1 inch (2.3 mm.); and a fabric weight per square yard of about 3.3 ounces (1413 grains).

The flexibility and drape of this stitch-bonded fabric is determined by a trumpet test and by a drape-flex test. The results of such tests are as follows:

Trumpet test: Grams
    Warp _____ 21
    Filling _____ 20

Drape-flex test: Inches
    Warp _____ 3.00
    Filling _____ 3.38

A comparison of such test values with the test values obtained for the prior art woven backing fabric of Example 1 would indicate that the stitch-bonded backing fabric of the present invention has a stiffer hand. This would lead one to predict that the resulting laminated fabric using the stitch-bonded backing fabric of the present invention would also have a stiffer hand.

The facing fabric which is used is similar to that used in Example 1 and is a plain black, woven twill, woolen facing fabric having a weight per square yard of about 8 ounces (3492 grains).

The stitch-bonded backing fabric is adhesively secured to the woolen facing fabric by dry deposition in intermittent-spaced fashion on the stitch-bonded backing fabric of about 0.8 ounce (340 grains) per square yard of thermoplastic, heat-activatable polyethylene granules having a nominal mesh size of 30 mesh. The pressure bonding of the two fabrics takes place on a continuous bonding machine at a drum temperature of about 310° F.

The weight of the laminated fabric is about 12 ounces (5220 grains) per square yard. The flexibility and drape is determined by a trumpet test and by a drape-flex test. The results of such tests are as follows:

Trumpet test: Grams
    Woolen side down—Total readout _____247
    Reverse side—Total readout _____ 216

Drape-flex test: Inches
    Warp _____ 2.43
    Filling _____ 2.0

The resulting laminated fabric of this example surprisingly has better drape and flexibility and a softer hand than the conventional prior art laminated fabric of Example 1 which used a woven backing fabric. This is all the more surprising when it is to be noted that the invention backing fabric to Example 2 is approximately double the weight of the comparison prior art backing fabric of Example 1. The laminated fabric of this example is extremely well suited for use as ladies coating material.

Example 3

The procedures of Example 2 are followed substantially as set forth therein with the exception that the warp yarns are omitted and a plain chain stitch, such as illustrated in FIGS. 3 and 4 is used. All other sizes, weights, etc., remain essentially as set forth in Example 2.

The resulting laminated fabric is lighter in weight than the laminated fabric of Example 2, inasmuch as it does not contain any warp yarns, but is suitable for ladies apparel where such lighter weight is acceptable.

Example 4

The procedures of Example 3 are followed substantially as set forth therein with the exception that the filling yarns used are 20's singles cotton. A plain chain stitch, such as illustrated in FIGS. 3 and 4 is used. All other sizes, weights, etc., remain as set forth in Example 3.

The resulting laminated fabric is suitable for ladies coating material.

Example 5

The procedures of Example 2 are followed substantially as set forth therein except that spun rayon is used to replace the cotton yarns therein. In the backing fabric, the warp yarns are 30's cotton count; the filling yarns are 30's cotton count; and the stitching yarns are 30's cotton count. All other sizes, weights, etc., remain as set forth in Example 2.

The resulting laminated fabric is suitable for use in ladies coating material.

Example 6

The procedures of Example 2 are followed substantially as set forth therein except that the amount of adhesive add-on is increased approximately 40% to 1.12 ounces or 31.5 grams per square yard. All other sizes, weights, etc., remain as set forth in Example 2. The resulting laminated fabric is slightly heavier and slightly less flexible than the laminated fabric of Example 2 but is still suitable for ladies suiting material.

Example 7

The procedures of Example 2 are followed substantially as set forth therein except that a closed plain stitch as illustrated in FIG. 5 is used. In addition, a web of carded fibers is used as the fibrous layer. The stitch bonded fabric has a weight of 3.2 ounces per square yard. All other factors remain as set forth in Example 2. The resulting laminated fabric is suitable for ladies coating material.

Examples 8 and 9.

The procedures of Example 2 are followed substantially as set forth therein except that the polyethylene granules are replaced (1) by thermoplastic, heat-activatable Olin nylon 12 granules and (2) by polyvinyl acetate granules. The heating temperatures are (1) 325° F. and (2) 310° F. respectively. All other factors remain as set forth in Example 2.

The resulting laminated fabric is suitable for ladies coating material.

Although several specific examples of the inventive concept have been described, the same should not be construed as limitative of the broader aspects of the inventive concept, except as construed by the scope of the following claims.

What is claimed is:

1. A laminated fabric having a high degree of softness and smooth hand, excellent drape, a full body, and good bulk comprising: (1) a facing fabric comprising yarns manufactured from textile fibers and having good drape and hand and desirable surface characteristics; (2) a flexible, stabilized backing fabric comprising a layer of fibrous materials comprising warp yarns extending generally in the long direction of said layer of fibrous materials, filling yarns extending generally in the cross direction of said layer of fibrous materials, and an area pattern of stitched thread rows of warp thread yarn loops progressing generally in the long direction of said layer of fibrous materials sewing and bonding said layer together; and (3) adhesive materials in an area pattern of intermittent, spaced, discrete binder segments in an amount equal to from about 10 grams to about 60 grams per square yard substantially uniformly adhesively bonding together said facing fabric and said backing fabric into a laminated fabric having a high degree of softness and smooth hand, excellent drape, a full body, and good bulk.

2. A laminated fabric as defined in claim 1, wherein the layer of fibrous materials is sewn together in an area pattern of chain stitched rows of warp thread loops.

3. A laminated fabric as defined in claim 1, wherein the layer of fibrous materials is sewn together in an area pattern of interlocking chain stitched rows of warp thread loops.

4. A laminated fabric as defined in claim 1, wherein the layer of fibrous materials is sewn together in an area pattern of closed plain stitch rows of warp thread loops.

5. A laminated fabric as defined in claim 1, wherein the adhesive materials are thermoplastic, heat-activatable, discrete granules substantially uniformly distributed in intermittent bonding relationship with said facing fabric and said backing fabric.

6. A laminated fabric as defined in claim 1, wherein the adhesive materials are thermoplastic, heat-activatable discrete granules of polyethylene resin.

7. A laminated fabric as defined in claim 1, wherein the adhesive materials are thermoplastic, heat-activatable discrete particles of low melting point polyamide resin.

8. A laminated fabric as defined in claim 1, wherein the adhesive materials are thermoplastic, heat-activatable discrete particles of polyvinyl acetate resin.

9. A laminated fabric as defined in claim 1, wherein the adhesive materials are vinyl chloride plastisol deposited in discrete "dot" predetermined pattern.

References Cited

UNITED STATES PATENTS

| | | | |
|---|---|---|---|
| 3,392,078 | 7/1968 | Duhl | 66—192X |
| 2,992,149 | 7/1961 | Drelich | 161—83 |
| 2,890,579 | 6/1959 | Maversberger | 66—192 |
| 3,279,221 | 10/1966 | Gliksmann | 66—192 |
| 2,603,575 | 7/1952 | Schramm, Jr. | 117—16 |

OTHER REFERENCES

Warp Knit Fabrics and Products, Pt. 2, Knitted Outerwear Times, vol. 37, No. 15, Apr. 8, 1968, pp. 39 and 45.

PHILIP DIER, Primary Examiner

U.S. Cl. X.R.

66—192; 117—16; 161—83, 162